US011427478B2

(12) United States Patent
Hekselman et al.

(10) Patent No.: US 11,427,478 B2
(45) Date of Patent: Aug. 30, 2022

(54) RECYCLING OF LEAD- AND TIN-BASED MATERIALS

(71) Applicant: Imperial College Innovations Limited, London (GB)

(72) Inventors: Aleksandra Katarzyna Hekselman, London (GB); David Payne, London (GB); Yanying Wang, London (GB); Andrew Ballantyne, London (GB)

(73) Assignee: Imperial College Innovations Limited, London (GB)

( * ) Notice: Subject to any disclaimer, the term of this patent is extended or adjusted under 35 U.S.C. 154(b) by 0 days.

(21) Appl. No.: 17/265,113

(22) PCT Filed: Aug. 2, 2019

(86) PCT No.: PCT/GB2019/052172
§ 371 (c)(1),
(2) Date: Feb. 1, 2021

(87) PCT Pub. No.: WO2020/025970
PCT Pub. Date: Feb. 6, 2020

(65) Prior Publication Data
US 2021/0317001 A1 Oct. 14, 2021

(30) Foreign Application Priority Data
Aug. 3, 2018 (GB) .................................... 1812664

(51) Int. Cl.
| C01G 21/00 | (2006.01) |
| C01G 21/02 | (2006.01) |
| C01G 19/02 | (2006.01) |
| C22B 7/00 | (2006.01) |
| C22B 3/00 | (2006.01) |
| C22B 25/06 | (2006.01) |
| H01M 10/54 | (2006.01) |

(52) U.S. Cl.
CPC ............. *C01G 21/02* (2013.01); *C01G 19/02* (2013.01); *C22B 7/006* (2013.01); *C22B 13/045* (2013.01); *C22B 25/06* (2013.01); *H01M 10/54* (2013.01)

(58) Field of Classification Search
CPC ........ C01G 21/02; C01G 19/02; C22B 13/04; C22B 13/045; C22B 7/006; C22B 25/06; C22B 25/04; H01M 10/54
USPC .......................................................... 423/92
See application file for complete search history.

(56) References Cited

U.S. PATENT DOCUMENTS

| 5,145,532 A * | 9/1992 | Fukunaga .............. B23K 35/34 148/23 |
| 10,774,433 B2 * | 9/2020 | Poll ........................ H01M 6/52 |
| 2004/0097755 A1 | 5/2004 | Abbott et al. | |
| 2010/0040938 A1 * | 2/2010 | Kumar ................... H01M 10/54 429/49 |
| 2012/0195822 A1 * | 8/2012 | Werner .................. C01G 19/02 423/618 |
| 2013/0186862 A1 | 7/2013 | Pearson et al. | |
| 2014/0008238 A1 | 1/2014 | Zhou et al. | |
| 2015/0233004 A1 | 8/2015 | Ho et al. | |
| 2015/0367311 A1 * | 12/2015 | Spence .................... B01J 6/002 422/187 |
| 2018/0179650 A1 | 6/2018 | Poll et al. | |

FOREIGN PATENT DOCUMENTS

| CN | 101573461 A | 11/2009 |
| CN | 102703719 A | 10/2012 |
| CN | 103022594 A | 4/2013 |
| CN | 103643262 A | 3/2014 |
| CN | 104131312 A | 11/2014 |
| EP | 0429044 A1 | 5/1991 |
| EP | 1324979 B1 | 11/2006 |
| WO | WO 2015/057189 A1 | 4/2015 |
| WO | WO 2016/183428 A1 | 11/2016 |
| WO | WO 2016/198872 A1 | 12/2016 |

OTHER PUBLICATIONS

Dai et al., "Natural Deep Eutectic Solvents as New Potential Media For Green Technology", Analytica Chimica Acta, Mar. 1, 2013, 766: 61-68.
International Search Report and Written Opinion for PCT International Patent Application No. PCT/GB2016/051704, dated Aug. 23, 2016.
International Search Report and Written Opinion for PCT International Patent Application No. PCT/GB2019/052172, dated Jul. 10, 2019.
Karimi et al., "Deep Eutectic Liquid Organic Salt as a New Solvent for Liquid-Phase Microextraction and its Application in Ligandless Extraction and Pre-Concentration of Lead and Cadmium in Edible Oils", Talanta, Jul. 7, 2015, 144: 648-654.
Ru et al., "Effects of existence form and concentration of PbO on the conductivity of choline chloride-urea deep eutectic solvent", J. Mol. Liquids, Nov. 2014, 199: 208-214.
Search and Examination Report for Great Britain Patent Application No. 1812664.9, dated Jan. 30, 2019.
Search and Examination Report for Great Britain Patent Application No. 1510316.1, dated Mar. 15, 2016.
Smith et al., "Deep Eutectic Solvents (DESs) and Their Applications", Chemical Reviews, Oct. 10, 2014, 114(21): 11060-11082.
U.S. Appl. No. 15/735,453, 2018/0179650, filed Dec. 12, 2017, filed Jun. 28, 2018, Christopher Gavin Poll.

* cited by examiner

*Primary Examiner* — Steven J Bos
(74) *Attorney, Agent, or Firm* — Lathrop GPM LLP; Brian C. Trinque; Nicole Sassu

(57) ABSTRACT

This invention relates to a process for obtaining lead (Pb) and/or tin (Sn) from a lead- and/or tin-based material using a deep eutectic solvent.

21 Claims, 7 Drawing Sheets

RECYCLING OF LEAD- AND TIN-BASED MATERIALS

CROSS REFERENCE TO RELATED APPLICATION

This application is a 35 U.S.C. § 371 filing of International Patent Application No. PCT/GB2019/052172, filed Aug. 2, 2019, which claims priority to Great Britain Patent Application No. 1812664.9, filed Aug. 3, 2018, which is incorporated herein by reference in its entirety.

FIELD OF THE INVENTION

This invention relates to a process for obtaining lead (Pb) and/or tin (Sn) from a lead- and/or tin-based material. This invention is particularly useful for the recycling of the lead-based materials that result from energy generation processes, such as the waste products from lead acid batteries.

BACKGROUND TO THE INVENTION

Lead and lead compounds are predominantly used in energy applications, with conventional lead-acid batteries (LABs) accounting for the most popular power supply for automotive industry. The global market for lead-acid batteries was valued at USD 46.6 billion in 2015 and is witnessing a noticeable growth due to the continued increase in fossil-fuel driven vehicles, and an increasing demand for energy from smart grid technology. Next generation lead-acid batteries are gaining a significant importance in this sector, which includes hybrid and electric vehicles and energy storage from renewable energy sources.

Despite the widespread and new emerging applications, a major challenge facing the lead-acid technology is its toxicity and the environment impact of lead. The increasing demand for LABs, it is of vital importance that the contamination of the environment is minimised at their end life by an effective recycling system.

Currently, there are two processes dominating industrial recycling of lead and lead compounds from lead-acid batteries. The traditional pyrometallurgical process recovers Pb at very high rates (up to 98%) but is very energy intensive due high-temperature operation, significant production of $CO_2$ and need to eliminate any lead-to-air emissions. The second process, hydrometallurgical route, produces metallic Pb from spent batteries via electrolytic deposition, also known as electro-winning, through a solution-based method and at temperatures close to room temperature. This process significantly reduces $SO_2$ and lead dust emissions, but the overall energy efficiency of electro-winning is lower in comparison to pyrometallurgical process due to a low solubility of lead compounds in a variety of different solvents.

Lead(II) sulphate ($PbSO_4$) and lead(IV) oxide ($PbO_2$) are of vital importance in lead acid batteries. The charged lead acid battery has one electrode of Pb and one of $PbO_2$, whilst the discharged battery has two electrodes of $PbSO_4$. Thus, the ability to recycle $PbSO_4$ and $PbO_2$ from a spent lead acid battery is desirable.

Moreover, it is not only lead from lead acid batteries that require new methods for recycling. The emerging technologies of lead telluride thermoelectrics and lead perovskite solar cells show potential as key lead-based materials in the developing renewable energy landscape. These technologies, however, are often considered to be limited due to their reliance on toxic lead, and the subsequent risk of environmental damage when these devices reach the end of their working life. Currently there is no clear recycling technique for these materials. In the case of lead perovskite photovoltaics this is often considered to be one of the key limiting factors in their scale up and introduction to the marketplace. As lead is toxic the end of life issues for lead perovskite solar cells are pertinent. Three of the most commonly used and promising materials in the field of lead perovskite photovoltaics are $CH_3NH_3PbI_3$ ($MAPbI_3$), $HC(NH_2)_2PbI_3$ ($FAPbI_3$) and $CH_3NH_3PbI_{3-n}Cl_n$ ($MAPbI_{3-n}Cl_n$), wherein n is a value between 0 and 3. Through the safe and environmentally friendly recycling of lead perovskite solar cells, the issue surrounding the toxicity and pollution at the end of their working life can be overcome and these materials will be able to have a wider application in the marketplace.

As we are facing growing energy demands, we need to develop novel processes to recover lead from spent lead-acid batteries and solar cells. It is critically important to develop more sustainable methods, with a minimal pollution and low energy consumption in comparison with the traditional smelting and hydrometallurgical routes.

SUMMARY OF THE INVENTION

The invention provides a low-energy and low-pollution chemical method which may be used to extract lead from a lead-based material. The method may also be used to extract tin from a tin-based material.

In a first aspect, the invention provides a method comprising:
  combining a lead- and/or tin-based material, or a mixture thereof, and a compound comprising a carboxylic acid moiety in the presence of a deep eutectic solvent; and
  precipitating lead and/or tin carboxylate;
  wherein the lead-based material comprises Pb, PbO, $PbO_2$, $PbSO_4$, $PbCO_3$, $(PbCO_3)_2 \cdot Pb(OH)_2$, PbTe, or $APbX_3$, or a mixture thereof, wherein A is $CH_3NH_3$ or $HC(NH_2)_2$ and each X is independently I, Br or Cl; and
  wherein the tin-based material comprises $ASnX_3$, wherein A is $CH_3NH_3$ or $HC(NH_2)_2$ and each X is independently I, Br or Cl.

The method may preferably be used to extract lead from a lead-based material. The lead- and/or tin-based material may preferably be a lead-based material. The method may comprise:
  combining a lead-based material and a compound comprising a carboxylic acid moiety in the presence of a deep eutectic solvent; and
  precipitating lead carboxylate;
wherein the lead-based material comprises Pb, PbO, $PbO_2$, $PbSO_4$, $PbCO_3$, $(PbCO_3)_2 \cdot Pb(OH)_2$, PbTe, or $APbX_3$, or a mixture thereof, wherein A is $CH_3NH_3$ or $HC(NH_2)_2$ and each X is independently I, Br or Cl.

The method may comprise:
  combining a lead- and/or tin-based material, or a mixture thereof, with a deep eutectic solvent;
  adding a compound comprising a carboxylic acid moiety; and
  precipitating lead and/or tin carboxylate;
  wherein the lead-based material comprises Pb, PbO, $PbO_2$, $PbSO_4$, $PbCO_3$, $(PbCO_3)_2 \cdot Pb(OH)_2$, or PbTe, or $APbX_3$, or a mixture thereof, wherein A is $CH_3NH_3$ or $HC(NH_2)_2$ and each X is independently I, Br or Cl; and
  wherein the tin-based material comprises $ASnX_3$, wherein A is $CH_3NH_3$ or $HC(NH_2)_2$ and each X is independently I, Br or Cl.

The method may comprise:
combining a lead- and/or tin-based material, or a mixture thereof, with a deep eutectic solvent comprising a compound comprising a carboxylic acid moiety; and precipitating lead and/or tin carboxylate;
wherein the lead-based material comprises Pb, PbO, $PbO_2$, $PbSO_4$, $PbCO_3$, $(PbCO_3)_2.Pb(OH)_2$, PbTe, or $APbX_3$, or a mixture thereof, wherein A is $CH_3NH_3$ or $HC(NH_2)_2$ and each X is independently I, Br or Cl; and wherein the tin-based material comprises $ASnX_3$, wherein A is $CH_3NH_3$ or $HC(NH_2)_2$ and each X is independently I, Br or Cl.

The compound comprising a carboxylic acid moiety may preferably be a compound of formula:

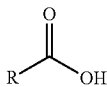

wherein R is H or a straight or branched $C_{1-6}$ alkyl, substituted with 0-4 substituents independently selected from OH or COOH.

The compound comprising a carboxylic acid moiety may preferably be a compound comprising at least two carboxylic acid moieties. The compound comprising at least two carboxylic acid moieties may preferably be a compound of formula:

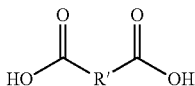

wherein R' is a straight or branched $C_{1-6}$ alkyl, substituted with 0-3 substituents independently selected from OH or COOH. Preferably, a compound comprising a carboxylic acid moiety is a dicarboxylic acid or a tricarboxylic acid.

The compound comprising a carboxylic acid moiety may preferably be acetic acid, oxalic acid or citric acid or a mixture thereof. The compound comprising a carboxylic acid moiety may preferably be oxalic acid or citric acid, preferably oxalic acid.

The lead- and/or tin-based material and the compound comprising a carboxylic acid moiety may be combined in the presence of a deep eutectic solvent and water, preferably wherein the water is present in an amount of up to 50% by weight of the deep eutectic solvent.

The deep eutectic solvent may comprise a hydrogen bond donor and an ammonium salt. The deep eutectic solvent may be formed from a mixture of a metal chloride hydrate with a hydrogen bond donor. The hydrogen bond donor may be ethylene glycol, glycerol, propylene glycol, fructose, xylitol, erythritol, 1,6-hexanediol, urea, acetamide, 1-methyl urea, 1,3-dimethyl urea, 1,1-dimethyl urea, thiourea and benzamide, oxalic acid, malonic acid, benzoic acid, adipic acid, succinic acid, citric acid or water, or mixtures thereof. The primary, secondary, tertiary or quaternary ammonium salt (preferably a quaternary ammonium salt) may be choline chloride. The metal chloride hydrate may be lithium chloride, sodium chloride, aluminium trichloride, tin chloride or zinc chloride, or mixtures thereof.

Preferably the deep eutectic solvent is selected from:
a mixture of choline chloride and urea, preferably wherein the molar ratio is about 4:1 to 1:6, preferably in a 1:2 molar ratio;
a mixture of choline chloride and ethylene glycol, preferably wherein the molar ratio is about 5:1 to 1:20, preferably in a 1:2 molar ratio;
a mixture of choline chloride and propylene glycol, preferably wherein the molar ratio is about 5:1 to 1:20;
a mixture of choline chloride and butanediol, preferably wherein the molar ratio is about 5:1 to 1:20;
a mixture of choline chloride and glycerol, preferably wherein the molar ratio is about 5:1 to 1:20;
a mixture of choline chloride and acetic acid, preferably wherein the molar ratio is about 5:1 to 1:10;
a mixture of choline chloride and malonic acid, preferably wherein the molar ratio is about 4:1 to 1:6;
a mixture of oxalic acid and choline chloride, preferably wherein the molar ratio is about 2:1 to 1:2, preferably about 1:1;
a mixture of choline chloride and glucose, preferably wherein the molar ratio is about 6:1 to 1:6;
a mixture of choline chloride and fructose, preferably wherein the molar ratio is about 6:1 to 1:6;
a mixture of choline chloride and xylitol, preferably wherein the molar ratio about 6:1 to 1:6;
a mixture of choline chloride and erythritol, preferably wherein the molar ratio is about 6:1 to 1:6;
a mixture of lithium chloride and ethylene glycol, preferably wherein the molar ratio is about 4:1 to 1:4
a mixture of sodium chloride and ethylene glycol, preferably wherein the molar ratio is about 4:1 to 1:4;
a mixture of lithium chloride and water, preferably wherein the molar ratio is about 4:1 to 1:4;
a mixture of aluminium trichloride and acetamide, preferably wherein the molar ratio is about 4:1 to 1:4;
a mixture of aluminium trichloride and urea, preferably wherein the molar ratio is about 4:1 to 1:4; and
a mixture of tin chloride dihydrate and ethylene glycol, preferably wherein the molar ratio is about 4:1 to 1:4.

The deep eutectic solvent preferably comprises oxalic acid and choline chloride or ethylene glycol and choline chloride, optionally oxalic acid and choline chloride in a molar ratio of about 1:1 or ethylene glycol and choline chloride in a molar ratio of about 2:1.

The deep eutectic solvent may be a natural deep eutectic solvent comprising: an acid and quaternary ammonium salt; an acid and betaine; an acid and an acid; an acid and an amino acid; an acid and a sugar; a combination of any of these, wherein the acid, amino acid, sugar and quaternary ammonium salt are selected from any of those set out in Table 1.

The deep eutectic solvent may be a natural deep eutectic solvent comprising any of the components indicated in Table 1, optionally at the molar ratio indicated in Table 1.

The lead-based material may preferably comprise Pb, PbO, $PbO_2$, $PbSO_4$, $PbCO_3$, $(PbCO_3)_2.Pb(OH)_2$, $CH_3NH_3PbI_3$ ($MAPbI_3$), $HC(NH_2)_2PbI_3$ ($FAPbI_3$) or $CH_3NH_3PbI_{3-n}Cl_n$ ($MAPbI_{3-n}Cl_n$), or a mixture thereof, wherein n is a value between 0 and 3. The lead-based material may preferably comprise Pb, PbO, $PbO_2$, $PbSO_4$, $PbCO_3$, or $(PbCO_3)_2.Pb(OH)_2$, or a mixture thereof.

The lead-based material may be a de-sulfurised lead-based material. The lead-based material may comprise Pb, PbO, $PbO_2$, $PbCO_3$, or $(PbCO_3)_2.Pb(OH)_2$, or a mixture thereof.

The lead- or tin-based materials are preferably dissolved in the DES to form a solution before precipitation of lead and/or tin carboxylate. A concentration of lead- or tin-based material of about 1 $gL^{-1}$ to about 100 $gL^{-1}$ may be dissolved in the deep eutectic solvent, preferably about 1 $gL^{-1}$ to about 50 gL$^{-1}$. A concentration of lead- or tin-based material of about 0.005 mol L$^{-1}$ to about 0.5 mol L$^{-1}$ may be dissolved in the deep eutectic solvent, preferably about 0.005 mol L$^{-1}$ to about 0.25 mol L$^{-1}$. Any undissolved lead- or tin-based material may preferably be removed from the solution by filtration.

The method may further comprise the step of filtering the precipitated lead and/or tin carboxylate. The deep eutectic solvent may then be recovered and recycled. This results in a more economic process.

The precipitated lead and/or tin carboxylate may be anhydrous or in hydrated form.

The method may comprise a calcination step. Preferably, the method may comprise a calcination step to convert lead carboxylate to leady oxide. The method may further comprise the step of heating the lead carboxylate to form leady oxide, optionally wherein the lead carboxylate is heated to at least about 300° C., preferably at least about 350° C. Preferably, the lead carboxylate is heated to about 350 to about 750° C., preferably about 350 to about 450° C. Preferably, the lead carboxylate is heated in air or under an inert atmosphere (e.g., under a nitrogen atmosphere). The $CO_2$ released during the calcination step could be incorporated into further commercial processes, for example it could be incorporated into $CO_2$ reduction/methanol formation technology.

The method may be a batch process. Alternatively, the method may be a continuous process.

In a second aspect, the invention provides a mixture comprising a lead- and/or tin-based material, or a mixture thereof, a compound comprising a carboxylic acid moiety and a deep eutectic solvent, wherein the lead-based material comprises Pb, PbO, $PbO_2$, $PbSO_4$, $PbCO_3$, $(PbCO_3)_2 \cdot Pb(OH)_2$, PbTe, or $APbX_3$, or a mixture thereof, wherein A is $CH_3NH_3$ or $HC(NH_2)_2$ and each X is independently I, Br or Cl; and wherein the tin-based material comprises $ASnX_3$, wherein A is $CH_3NH_3$ or $HC(NH_2)_2$ and each X is independently I, Br or Cl.

The mixture may comprise a lead- and/or tin-based material, a compound comprising a carboxylic acid moiety and a deep eutectic solvent comprising an amide or alcohol hydrogen bond donor. Alternatively, the mixture may comprise a lead- and/or tin-based material and a deep eutectic solvent comprising a compound comprising a carboxylic acid moiety.

In a third aspect, the invention provides a lead and/or tin-carboxylate formed by a method comprising:
  combining a lead- and/or tin-based material, or a mixture thereof, and a compound comprising a carboxylic acid moiety in the presence of a deep eutectic solvent; and
  precipitating lead and/or tin carboxylate;
  wherein the lead-based material comprises Pb, PbO, $PbO_2$, $PbSO_4$, $PbCO_3$, $(PbCO_3)_2 \cdot Pb(OH)_2$, PbTe, or $APbX_3$, or a mixture thereof, wherein A is $CH_3NH_3$ or $HC(NH_2)_2$ and each X is independently I, Br or Cl; and wherein the tin-based material comprises $ASnX_3$, wherein A is $CH_3NH_3$ or $HC(NH_2)_2$ and each X is independently I, Br or Cl.

The precipitated lead and/or tin-carboxylate may be anhydrous or in hydrated form.

The lead and/or tin carboxylate may then be collected (optionally by filtration). Lead carboxylate may then optionally converted to leady oxide by heating optionally wherein the lead carboxylate is heated to at least about 300° C., preferably at least about 350° C. Preferably, the lead carboxylate is heated to about 350 to about 750° C., preferably about 350 to about 450° C. Preferably, the lead carboxylate is heated in air or under an inert atmosphere (e.g., under a nitrogen atmosphere).

The lead and/or tin carboxylate may be formed by a method comprising:
  combining a lead- and/or tin-based material, or a mixture thereof, with a deep eutectic solvent;
  adding a compound comprising a carboxylic acid moiety; and
  precipitating lead and/or tin carboxylate.

The lead and/or tin carboxylate may be formed by a method comprising:
  combining a lead- and/or tin-based material, or a mixture thereof, with a deep eutectic solvent comprising a compound comprising a carboxylic acid moiety; and
  precipitating lead and/or tin carboxylate.

In a fourth aspect, the invention provides a method or mixture substantially as herein described, with reference to or as illustrated in one or more of the example or accompanying figures.

All features of each of the first aspect of the invention as described above can be applied to the second to fourth aspects of the invention mutatis mutandis.

DETAILED DESCRIPTION

Figure 1:
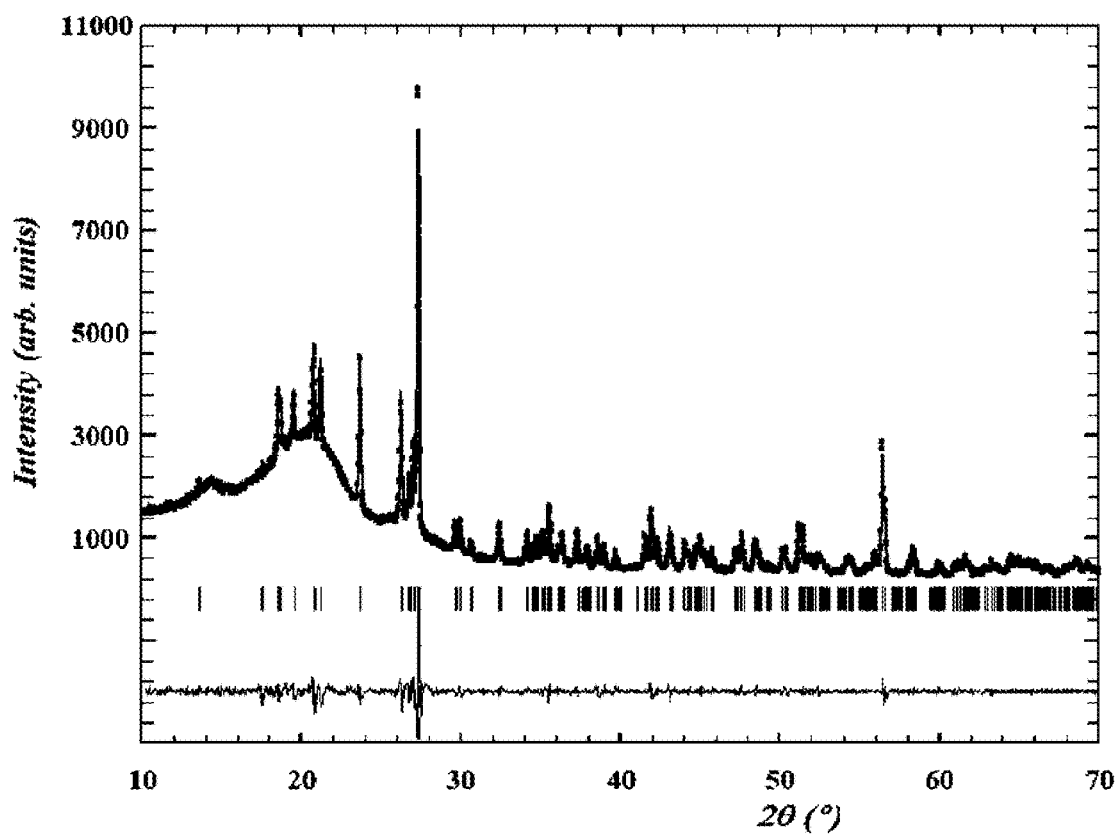
FIG. 1 shows X-ray powder diffraction pattern and LeBail refinement fitting of a precipitated powder obtained from dissolution of Pb paste in Oxaline.

Described herein is a low-energy and low-pollution chemical method which may be used to extract lead from a lead-based material, or tin from a tin-based material. These lead or tin-based materials may particularly be used in or result from energy generating processes, and these waste lead- or tin-based materials may be recycled into new lead or tin products. This method may be used as, for example, an alternative to current smelting processes dominating the lead-acid battery recycling industry.

The principle is based on two simple chemical conversion processes that, in certain embodiments, use spent lead paste (solid battery waste lead-based material comprised of lead and lead-compounds) to produce lead oxide(s), a commodity lead material which can be directly used in a production of new batteries.

Accordingly, described herein is a method comprising:
  combining a lead- and/or tin based material, or a mixture thereof, and a compound comprising a carboxylic acid moiety in the presence of a deep eutectic solvent; and precipitating lead and/or tin carboxylate;
wherein the lead-based material comprises Pb, PbO, $PbO_2$, $PbSO_4$, $PbCO_3$, $(PbCO_3)_2 \cdot Pb(OH)_2$, PbTe, or $APbX_3$, or a mixture thereof, wherein A is $CH_3NH_3$ or $HC(NH_2)_2$ and each X is independently I, Br or Cl; and
wherein the tin-based material comprises $ASnX_3$, wherein A is $CH_3NH_3$ or $HC(NH_2)_2$ and each X is independently I, Br or Cl.

The method may further comprise the step of filtering the precipitated lead and/or tin carboxylate from the resulting slurry following precipitation. The precipitated lead and/or tin carboxylate may be anhydrous or in hydrated form, for example a monohydrate, dihydrate or trihydrate.

The method may also further comprise the step of heating the lead carboxylate to form leady oxide. The recycled leady oxide may, for example, then be directly used in a preparation of electrodes for new lead-acid batteries. The leady oxide may be subjected to further processing steps before it may be used in new products.

Alternating the temperature to which the lead carboxylate is heated may allow control of the chemical composition of the resulting leady oxide. This allows production of a leady oxide which may have applications in either anode or cathode materials in new batteries.

As used herein, leady oxide comprises lead oxide or lead, or a mixture thereof. For example, leady oxide may comprise PbO or Pb or a mixture thereof, preferably β-PbO, α-PbO, $PbO_2$, $Pb_3O_4$ or Pb or a mixture thereof.

In comparison, currently the most efficient pyrometallurgical process would require at least three high-temperature and high-energy steps (melting and reducing the lead paste from spent batteries at, for example, 1100-1300° C., separating the metallic lead from the by-products, further refining of crude lead to produce lead ingots or oxidising pure lead to lead oxides) before lead from spent batteries could be reused in new lead acid batteries.

The described method is solution-based, hence minimising environmental and health impact as it results in reduced lead, $SO_2$ and $CO_2$ emissions.

A deep eutectic solvent (DES) is a liquid solvent that is a mixture of two or more components forming a eutectic with a melting point lower than either of the individual components. Compared to ordinary solvents, deep eutectic solvents also have a low volatility, are non-flammable, are relatively inexpensive to produce, and may be biodegradable. DES have the potential to create a highly coordinating (and, therefore, solvating) environment that may be beneficial for the processing of lead-based materials. It has been found that deep eutectic solvents may be particularly useful in the solvation of lead-based materials and subsequent chemical extraction of lead from these lead-based materials.

Deep eutectic solvents may be formed from a mixture of an ammonium salt (for example, choline chloride) and a hydrogen bond donor (for example, amides, alcohols or carboxylic acids). Thus, a DES may be a type III DES. Alternatively, a deep eutectic solvent may be formed from a mixture of a metal chloride hydrate (for example, lithium chloride, sodium chloride, aluminium trichloride, tin chloride or zinc chloride) with a hydrogen bond donor (for example, alcohols or amides). Thus, a DES may be a type IV DES.

Alternatively, the deep eutectic solvent may be a natural deep eutectic solvent (NADES). As described in H. Vanda et al., Comptes Rendus Chimie, 2018, 21, 628-638, the entire contents of which are herein incorporated by reference, NADESs are mixtures of natural compounds, e.g. organic acids and bases, amino acids, sugars, sugar alcohols, and polyalcohols that interact through hydrogen bonding and liquefy if combined in specific molar ratios. NADES may be formed from mixtures of: an acid and quaternary ammonium salt; an acid and betaine (for example in a ratio of about 1:1 to 3:1); an acid and an acid (for example in a ratio of about 1:1); an acid and an amino acid (for example in a ratio of about 1:1 to 1:3); an acid and a sugar (for example, in a ratio of about 1:1 to 3:1); a combination of any of the above in an about 1:1:1 ratio. The acid, amino acid, sugar and quaternary ammonium salt are selected from any of those set out in Table 1. Suitable acids include Lactic acid, Malonic acid, oxalic acid, Maleic acid, dl-Malic acid, Citric acid, Aconitic acid, l-(+)-Tartaric acid, succinic acid, fumaric acid, malic acid, succinic acid, fumaric acid. Suitable amino acids include proline, alanine, arginine, serine. Suitable quaternary ammonium salts include choline chloride and choline bitatrate. Suitable sugars include Sucrose, d-(+)-Glucose, d-(−)-Fructose, Xylitol, Adonitol, d-Sorbitol, d-Mannose Inositol and raffinose.

Addition of water to NADESs have been shown to reduce preparation time, and decrease temperature and viscosity of NADESs. The NADESs used herein may further comprise water in an amount of up to 50 wt % of the total weight of the solvent.

Particularly useful ammonium salts are quaternary ammonium salts, for example halides (preferably chlorides). Quaternary ammonium salts include choline chloride (2-hydroxyethyl-trimethylammonium chloride), N-ethyl-2-hydroxy-N,N-dimethylethanaminium chloride, 2-(chlorocarbonyloxy)-N,N,N-trimethylethanaminium chloride or N-benzyl-2-hydroxy-N,N-dimethylethanaminium chloride.

Particularly useful hydrogen bond donors include alcohols (such as ethylene glycol, glycerol, propylene glycol, fructose, xylitol, erythritol and 1,6-hexanediol), amides (such as urea, acetamide, 1-methyl urea, 1,3-dimethyl urea, 1,1-dimethyl urea, thiourea and benzamide), carboxylic acids (such as malonic acid, benzoic acid, adipic acid, oxalic acid, succinic acid and citric acid) and water, and mixtures thereof. Preferably, the hydrogen bond donor is an alcohol, amide or carboxylic acid.

Exemplary type III deep eutectic solvent include systems formed of a mixture of an alcohol hydrogen bond donor and a quaternary ammonium salt, an amide hydrogen bond donor and a quaternary ammonium salt, or a carboxylic acid hydrogen bond donor and a quaternary ammonium salt.

Preferably the deep eutectic solvent is a Type III deep eutectic solvent and is selected from:
reline which is a mixture of choline chloride and urea, preferably wherein the molar ratio is about 4:1 to 1:6, preferably in a 1:2 molar ratio;
ethaline which is a mixture of choline chloride and ethylene glycol, preferably wherein the molar ratio is about 5:1 to 1:20, preferably in a 1:2 molar ratio;
propyline which is a mixture of choline chloride and propylene glycol, preferably wherein the molar ratio is about 5:1 to 1:20;
butaline which is a mixture of choline chloride and butanediol, preferably wherein the molar ratio is about 5:1 to 1:20;
glyceline which is a mixture of choline chloride and glycerol, preferably wherein the molar ratio is about 5:1 to 1:20;
acetiline which is a mixture of choline chloride and acetic acid, preferably wherein the molar ratio is about 5:1 to 1:10;

maline which is a mixture of choline chloride and malonic acid, preferably wherein the molar ratio is about 4:1 to 1:6;

an oxalic acid and choline chloride mixture, preferably wherein the molar ratio is about 2:1 to 1:2, preferably about 1:1;

a choline chloride and glucose mixture, preferably wherein the molar ratio is about 6:1 to 1:6;

a choline chloride and fructose mixture, preferably wherein the molar ratio is about 6:1 to 1:6;

a choline chloride and xylitol mixture, preferably wherein the molar ratio about 6:1 to 1:6; and a choline chloride and erythritol mixture, preferably wherein the molar ratio is about 6:1 to 1:6.

Particularly preferable deep eutectic solvents include systems formed of a mixture of ethylene glycol and choline chloride (preferably in a 2:1 molar ratio), urea and choline chloride (preferably in a 2:1 molar ratio) or oxalic acid and choline chloride (preferably in a 1:1 molar ratio).

Exemplary type IV deep eutectic solvents include the following:

a lithium chloride and ethylene glycol mixture, preferably wherein the molar ratio is about 4:1 to 1:4 a sodium chloride and ethylene glycol mixture, preferably wherein the molar ratio is about 4:1 to 1:4;

a lithium chloride and water mixture, preferably wherein the molar ratio is about 4:1 to 1:4;

an aluminium trichloride and acetamide mixture, preferably wherein the molar ratio is about 4:1 to 1:4;

an aluminium trichloride and urea mixture, preferably wherein the molar ratio is about 4:1 to 1:4; and a tin chloride dihydrate and ethylene glycol mixture, preferably wherein the molar ratio is about 4:1 to 1:4.

Further exemplary hydrogen bond donors, quaternary ammonium salts, metal chloride hydrates and deep eutectic solvent systems include those set out in E L Smith et al., Chemical Reviews, 114(21), 11060-11082, 2014 and US patent application no. 2017/0157717 A1, the entire contents of which are herein incorporated by reference.

Preferably the deep eutectic solvent is a natural deep eutectic solvent (NADES) as described in Y. Dai et al., Analytica Chimica Acta, 2013, 766, 61-68, for example comprising the components indicated in Table 1, below, optionally at the molar ratio indicated in Table 1.

TABLE 1

Different combinations of natural ionic liquids or deep eutectic solvents from natural products

| Component 1 | Component 2 | Component 3 | Mole ratio |
| --- | --- | --- | --- |
| Choline chloride | Lactic acid | | 1:1 |
| Choline chloride | Malonic acid | | 1:1 |
| Choline chloride | Maleic acid | | 1:1, 2:1 |
| Choline chloride | DL-Malic acid | | 1:1, 1.5:1 |
| Choline chloride | Citric acid | | 1:1, 2:1 |
| Choline chloride | Aconitic acid | | 1:1 |
| Choline chloride | L-(−)-Tartaric acid | | 2:1 |
| Choline chloride | Glycol | | 1:1,1:2 |
| Choline chloride | 1,2-Propanediol | | 1:1, 1:1.5, 1:2, 1:3 |
| Choline chloride | 1,2-Propanediol | | 2:1 |
| Choline chloride | Glycerol | | 1:1, 3:2 |
| Choline chloride | meso-Erythritol | | 2:1 |
| Choline chloride | Xylitol | | 5:2 |
| Choline chloride | Adonitol | | 5:2 |
| Choline chloride | Ribitol | | 5:2 |
| Choline chloride | D-Sorbitol | | 3:1, 5:2 |

TABLE 1-continued

Different combinations of natural ionic liquids or deep eutectic solvents from natural products

| Component 1 | Component 2 | Component 3 | Mole ratio |
| --- | --- | --- | --- |
| Choline chloride | D-Xylose | | 2:1, 3:1 |
| Choline chloride | A-L-Rhamnose | | 2:1 |
| Choline chloride | D-(+)-Glucose | | 1:1, 2:1 |
| Choline chloride | D-(+)-Glucose | | 5:2 |
| Choline chloride | D-(−)-Fructose | | 1:1, 1:1.5, 1:2 |
| Choline chloride | D-(−)-Fructose | | 5:2 |
| Choline chloride | Sorbose | | 5:2, 1:1 |
| Choline chloride | D-Mannose | | 5:2 |
| Choline chloride | D-(+)-Galactose | | 5:2 |
| Choline chloride | Sucrose | | 4:1, 1:1 |
| Choline chloride | D-(+)-Trehalose | | 4:1 |
| Choline chloride | Maltose | | 4:1 |
| Choline chloride | Raffinose | | 11:2 |
| Choline chloride | Proline | DL-Malic acid | 1:1:1 |
| Choline chloride | Xylitol | DL-Malic acid | 1:1:1 |
| Choline bitartrate | D-(+)-Glucose | | 1:1 |
| Betaine | D-(+)-Glucose | | 5:2 |
| Betaine | Sucrose | | 4:1, 1:1 |
| Betaine | Sucrose | | 2:1 |
| Betaine | D-(+)-Trehalose | | 4:1 |
| Betaine | D-Sorbitol | | 3:1 |
| Betaine | DL-Malic acid | | 1:1 |
| Betaine | L-(+)-Tartaric acid | | 2:1 |
| Betaine | D-Mannose | | 5:2 |
| Betaine | Inositol | Raffinose | 9:1:1 |
| Betaine | Sucrose | Proline | 5:1:1 |
| Betaine | Sucrose | Proline | 5:2:2 |
| Betaine | D-(+)-Glucose | Proline | 1:1:1 |
| Betaine | DL-Malic acid | D-(+)-Glucose | 1:1:1 |
| Betaine | DL-Malic acid | Proline | 1:1:1 |
| Betaine | DL-Malic acid | Inositol | 1:1:1 |
| Betaine | Oxalic acid | D-(+)-Glucose | 1:1:1 |
| Betaine | Citric acid | | 1:1 |
| Lactic acid | D-(+)-Glucose | | 5:1 |
| Lactic acid | -Alanine | | 1:1 |
| DL-Malic acid | D-Xylose | | 1:1 |
| DL-Malic acid | D-(+)-Glucose | | 1:1, 1:2 |
| DL-Malic acid | Sucrose | | 1:1 |
| DL-Malic acid | D-(−)-Fructose | | 1:1 |
| DL-Malic acid | D-Mannose | | 1:1 |
| DL-Malic acid | Sucrose | | 1:1, 2:1 |
| DL-Malic acid | Maltose | | 2:1 |
| DL-Malic acid | D-(+)-Trehalose | | 2:1 |
| DL-Malic acid | Lactose | | 2:1, 1:1 |
| DL-Malic acid | Raffinose | | 3:1 |
| DL-Malic acid | Xylitol | | 1:1 |
| DL-Malic acid | Adonitol | | 1:1 |
| DL-Malic acid | D-Sorbitol | | 1:1 |
| DL-Malic acid | D-(+)-Glucose | D-(−)-Fructose | 1:1:1 |
| DL-Malic acid | D-(+)-glucose | Glycerol | 1:1:1 |
| DL-Malic acid | Sucrose | Glycerol | 1:1:2 |
| DL-Malic acid | L-Proline | Choline chloride | 1:1:1 |
| Citric acid | D-Xylose | | 1:1 |
| Citric acid | D-(+)-Glucose | | 2:1 |
| Citric acid | D-(−)-Fructose | | 1:1 |
| Citric acid | Sorbose | | 1:1 |
| Citric acid | D-Mannose | | 1:1 |
| Citric acid | D-(+)-Galactose | | 1:1 |
| Citric acid | Sucrose | | 1:1 |
| Citric acid | Maltose | | 2:1 |
| Citric acid | D-(+)-Trehalose | | 2:1 |
| Citric acid | Raffinose | | 3:1 |
| Citric acid | D-Sorbitol | | 1:1 |
| Citric acid | Ribitol | | 1:1 |
| Citric acid | Xylitol | | 1:1 |
| Citric acid | Adonitol | | 1:1 |
| Citric acid | L-Proline | | 1:1, 1:2, 1:3 |
| Citric acid | DL-Malic acid | | 1:1 |
| Phytic acid sodium | DL-Malic acid | | 1:6 |
| Phytic acid sodium | Glycerol | | 1:6 |

TABLE 1-continued

Different combinations of natural ionic liquids or deep eutectic solvents from natural products

| Components | | | |
|---|---|---|---|
| Component 1 | Component 2 | Component 3 | Mole ratio |
| Phytic acid sodium | L-Proline | | 1:6 |
| Phytic acid sodium | D-(+)-Glucose | | 1:6 |
| Phytic acid sodium | Choline chloride | | 1:3 |
| D/L-Proline | Sucrose | | 2:1, 3:1 |
| D/L-Proline | Sucrose | | 4:1, 1:1 |
| D/L-Proline | D-Sorbitol | | 1:1 |
| D/L-Proline | D-(+)-Glucose | | 1:1, 2:1 |
| D/L-Proline | Lactic acid | | 1:1 |
| D/L-Proline | DL-Malic acid | | 1:1 |
| D/L-Proline | Citric acid | | 1:1, 1:2 |
| D/L-Proline | Malonic acid | | 1:1 |
| D-Proline | D-(+)-Glucose | | 5:3 |
| L-Proline | D-(+)-Glucose | | 5:3 |
| L-Serine | DL-Malic acid | | 3:2, 1:1 |
| L-Serine | D-(+)-Glucose | | 5:4 |
| L-Glutamic salt | Sucrose | | 2:1 |
| L-Glutamic salt | D-(+)-Glucose | | 1:1 |
| D-(+)-Glucose | DL-Malic acid | | 1:1 |
| D-(+)-Glucose | Citric acid | | 1:1 |
| D-(+)-Glucose | L-(+)-Tartaric acid | | 1:1 |
| D-(+)-Glucose | D-(−)-Fructose | Sucrose | 1:1:1 |
| D-(−)-Fructose | Sucrose | | 1:1 |
| -Alanine | DL-Malic acid | | 3:2, 1:1 |
| -Alanine | Citric acid | | 1:1 |
| Phytic acid sodium | DL-Malic acid | | 1:6 |

The deep eutectic solvent for use in the invention may be provided as a mixture with water (for example, where the deep eutectic solvent itself does not comprise water). Accordingly, the lead- and/or tin-based material and the compound comprising a carboxylic acid moiety may be combined as described herein in the presence of a deep eutectic solvent and water. Preferably, the deep eutectic solvent is an aqueous solvent. For example, the deep eutectic solvent may be mixed with water in an amount of up to 50% by weight of the deep eutectic solvent, preferably up to 25% by weight. The deep eutectic solvent described herein may be hygroscopic. The addition of some water may have benefits in terms of processing (e.g., lower viscosity of the solvent, improved solubility of lead or tin, easier filtering of the lead or tin carboxylate amongst others). Water may also be introduced into the system through generation in the reaction between the lead- or tin based material and the compound comprising a carboxylic acid moiety.

A compound comprising a carboxylic acid moiety is used to precipitate lead and/or tin carboxylate and may be referred to as a precipitation promoter. A compound comprising a carboxylic acid moiety may (e.g., a monocarboxylic acid, such as acetic acid, or a di- or tricarboxylic acid, such as oxalic acid or citric acid, or a mixture thereof.

Where the deep eutectic solvent is formed from a mixture of a carboxylic acid hydrogen bond donor and a quaternary ammonium salt or a natural deep eutectic solvent comprising a carboxylic acid, the carboxylic acid hydrogen bond donor of the deep eutectic solvent or the carboxylic acid of the natural deep eutectic solvent may function as the compound comprising at least two carboxylic acid moieties. Accordingly, further described herein is a method comprising:
  combining a lead- and/or tin-based material, or a mixture thereof, with a deep eutectic solvent comprising a compound comprising a carboxylic acid moiety; and
  precipitating lead and/or tin carboxylate;
  wherein the lead-based material comprises Pb, PbO, $PbO_2$, $PbSO_4$, $PbCO_3$, $(PbCO_3)_2.Pb(OH)_2$, PbTe, or $APbX_3$, or a mixture thereof, wherein A is $CH_3NH_3$ or $HC(NH_2)_2$ and each X is independently I, Br or Cl; and
  wherein the tin-based material comprises $ASnX_3$, wherein A is $CH_3NH_3$ or $HC(NH_2)_2$ and each X is independently I, Br or Cl. Such DES may include a mixture of oxalic acid and choline chloride, as described herein.

Where the deep eutectic solvent is formed from a mixture of an amide or alcohol hydrogen bond donor and a quaternary ammonium salt, or a natural deep eutectic solvent not comprising a carboxylic acid, addition of a compound comprising a carboxylic acid moiety is required. Accordingly, further described herein is a method comprising:
  combining a lead- and/or tin-based material with a deep eutectic solvent;
  adding a compound comprising a carboxylic acid moiety; and
  precipitating lead and/or tin carboxylate;
  wherein the lead-based material comprises Pb, PbO, $PbO_2$, $PbSO_4$, $PbCO_3$, $(PbCO_3)_2.Pb(OH)_2$, PbTe, or $APbX_3$, or a mixture thereof, wherein A is $CH_3NH_3$ or $HC(NH_2)_2$ and each X is independently I, Br or Cl; and
  wherein the tin-based material comprises $ASnX_3$, wherein A is $CH_3NH_3$ or $HC(NH_2)_2$ and each X is independently I, Br or Cl. Such DES may include a mixture of ethylene glycol and choline chloride or urea and choline chloride, as described herein.

The invention concerns the extraction of lead from lead-based materials. A lead-based material of the present invention is material containing a lead compound, i.e. a material comprising lead and at least one additional element. The lead-based material may be a lead salt, in particular a lead(II) or lead(IV) salt. The lead-based materials described herein may particularly be used in or result from energy generating processes such as those carried out in batteries or solar cells or resulting from thermoelectric processes. As used herein, the term 'lead species' relates to the lead ions of the particular lead-based material. Preferably the lead species is Pb(II) (alternative notation $Pb^{2+}$), or Pb(IV) ($Pb^{4+}$). Exemplary lead-based materials are compounds that contain Pb(II) or Pb(IV), such as those including the lead acid battery materials lead(II) sulfate ($PbSO_4$), lead(IV) oxide ($PbO_2$) and lead(II) oxide (PbO), the lead perovskite photovoltaic materials $CH_3NH_3PbHal_3$ ($MAPbHal_3$), $HC(NH_2)_2PbHal_3$ ($FAPbHal_3$), $CH_3NH_3PbI_{3-n}Cl_n$ ($MAPbI_{3-n}Cl_n$) and the thermoelectric material lead telluride (PbTe), or a mixture thereof, wherein Hal is I, Cl or Br, or a mixture thereof, preferably I, and wherein n is a value between 0 and 3, preferably n is less than 1.5, less than 1 or less than 0.5. Preferably the lead perovskite photovoltaic materials are $CH_3NH_3PbI_3$ ($MAPbI_3$), $HC(NH_2)_2PbI_3$ ($FAPbI_3$) or $CH_3NH_3PbI_{3-n}Cl_n$ ($MAPbI_{3-n}Cl_n$), or mixtures thereof.

Preferably, the lead-based material is spent lead paste, a solid waste obtained after grinding spent lead-acid batteries (LABs) and separation of liquid electrolyte (e.g., sulfuric acid) and plastic components (e.g., polypropylene). The substantial components in spent lead paste are $PbSO_4$, $PbO_2$, PbO and Pb. To avoid emissions of $SO_2$ during a recycling process, sulfur is often removed by reaction with aqueous alkali carbonates to convert $PbSO_4$ to $PbCO_3$. This is referred to herein, and generally in this technical field, as "desulfurisation".

Preferably, the methods described herein use desulfurised lead paste. Desulfurised lead paste may comprise a mixture of $PbCO_3$, $(PbCO_3)_2 \cdot Pb(OH)_2$, $PbO_2$, PbO and/or Pb. It will be appreciated that desulfurised lead paste may still contain trace amounts of $PbSO_4$.

A tin-based material of the present invention is material containing a tin compound, i.e. a material comprising tin and at least one additional element. The tin-based material may be a tin salt, in particular a tin(II) salt. The tin-based materials described herein may particularly be used in or result from energy generating processes such as those carried out in solar cells. Exemplary tin-based materials include $ASnX_3$, wherein A is $CH_3NH_3$ or $HC(NH_2)_2$ and each X is independently I, Br or Cl.

Advantageously, the solubility product constants ($K_{sp}$) of the lead- or tin-based material is greater than solubility product constants of the lead or tin carboxylates. The solubility product constant is the equilibrium constant for a solid substance (i.e., the lead- or tin-based material) dissolving in an aqueous solution. It represents the level at which a solute dissolves in solution. If the solubility product constants of the lead- or tin-based material is greater than solubility product constants of the lead or tin carboxylates, this may (1) enable dissolving of lead or tin-based compounds in the deep eutectic solvent in high concentrations and (2) ensure a selective precipitation of lead or tin carboxylates, and may help minimise potential impurities such as $PbX_2$ (wherein each X is independently I, Br, Cl).

Selection of a particular deep eutectic solvent for a particular lead- or tin-based material may allow optimisation of the method.

Solubilities can be determined experimentally using inductively coupled plasma spectrometry to detect the concentration of a material in a solvent at a certain temperature. From this solubility, the solubility product constant ($K_{sp}$) may be determined.

The methods described herein may be batch processes. Alternatively, the methods described herein may be continuous processes. Such continuous processes may further increase the commercial viability of the method.

A continuous process may be carried out using, for example, three continuous stir-tank reactors. The first reactor may be used to feed the lead-based material to a deep eutectic solvent and, optionally, allow the optimal dissolution of the lead- and/or tin based material. In the second tank, the compound comprising a carboxylic acid moiety may be introduced to the lead- and/or tin based material, thereby precipitating lead and/or tin carboxylate. The resulting slurry containing the lead and/or tin carboxylate precipitate may then be fed to, for example, a rotary vacuum-drum filter to separate the liquid-solid suspension. The resulting lead and/or tin carboxylate cake may then be discharged as a solid with the DES solution being passed into a third reactor for removal of the excess carbonate, before being circulated back for another cycle.

Such a continuous flow process allows precise control of reaction conditions in comparison to batch production. It also allows safer handling of the potentially hazardous lead-based material and any lead products. It also allows potentially automated 24/7 operation time to maximise production and eliminate extra costs of starting/stopping the process, reduced waste, easier to scale-up and more time, energy and cost effective.

Throughout the description and claims of this specification, the words "comprise" and "contain" and variations of the words, for example "comprising" and "comprises", mean "including but not limited to", and are not intended to (and do not) exclude other components.

It will be appreciated that variations to the foregoing embodiments of the invention can be made while still falling within the scope of the invention. Each feature disclosed in this specification, unless stated otherwise, may be replaced by alternative features serving the same, equivalent or similar purpose. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

It will be appreciated that many of the features described above, particularly of the preferred embodiments, are inventive in their own right and not just as part of an embodiment of the present invention. Independent protection may be sought for these features in addition to or alternative to any invention presently claimed.

Reference is now made to the following examples, which illustrate the invention in a non-limiting fashion.

EXAMPLES

Example 1

Deep Eutectic Solvents Preparation

Choline chloride (Sigma, ≥98%) and oxalic acid (anhydrous, Sigma, ≥99%) were mixed together in a 1:1 molar ratio and stirred at temperature not exceeding 50° C. until a clear, homogenous solution was formed, also commercially known as Oxaline. Ethaline 200 was prepared by mixing choline chloride (Sigma, ≥98%) and ethylene glycol (Sigma, ≥98%) in a 1:2 molar ratio and stirring at 60° C. until a clear, homogenous solution was formed.

Preparation of Lead Solutions and Conversion to Lead Oxalate and Lead Oxides

Lead solutions were prepared by dissolving desulphated lead battery paste (EnviroWales Ltd., used as received) in Deep Eutectic Solvents. The typical concentrations were approx. 5.5 mg of Pb paste per 1 ml of solvent, corresponding to ~23 mmol of Pb per 1 L of solvent. Lead solutions in Oxaline were prepared at room temperature and Ethaline solutions were pre-heated at 80° C. for 24 h before allowing to cool down to room temperature. All lead solutions were vigorously stirred for 24 h in sealed vials. The resulting colloidal suspensions were centrifuged at 5300 r.p.m. for 30 minutes to separate liquor and precipitates. The liquors were carefully decanted, and the precipitates were washed with water and acetone, followed by centrifugation at 5300 r.p.m. for 30 minutes after each step. The precipitates were dried under vacuum either at room temperature or at 140° C. in a Buchi drying oven. Subsequently, the precipitates were combusted in alumina crucibles for up to 12 h in air at temperatures up to 600° C. with a heating rate of 2° $min^{-1}$).

Characterisation Methods

A PANalytical X'Pert MR/PD X-ray diffractometer with nickel filtered copper Kα radiation ($\lambda_{avg}$=1.5418 Å) operating in a transmission mode was used to acquire X-ray diffraction patterns of precipitates and combusted powders. Diffraction data were collected in a 2θ range 5 to 80° with a step size of 0.016° and time per step of 20 s. Kapton film was used to prevent any spillage and exposure to the lead-containing powder during analysis. The data were processed using inbuilt Panalytical X'Pert Pro software and the structures were refined by LeBail method using FullProf Suite.

X-ray photoelectron spectra were recorded on a Thermo Fisher K-alpha operating at $2\times10^{-9}$ mBar base pressure. The system was equipped with a monochromated Al Kα X-ray source microfocused to a spot size of 400 μm. The detector was a 180° double focusing hemispherical analyser with a 2D detector. Samples were mounted on conducting carbon tape. The data was manipulated using the inbuilt Avantage software.

Thermogravimetric and differential thermal analyses (TG-DTA) of the precipitates were carried out using Stanton Redcroft STA-780 TGA-DTA Thermal Analyser coupled with Rheometric Scientific System Interface. The thermal effects were investigated from room temperature to 800° C. with 10° min$^{-1}$ heating rate, using alumina crucibles in flowing air atmosphere.

Results and Discussion

Lead paste is a solid waste obtained after grinding spent lead-acid batteries (LABs) and separation of liquid electrolyte (sulphuric acid) and plastic components (polypropylene). The major phases in spent lead paste are $PbSO_4$, $PbO_2$, PbO and Pb. To avoid emissions of $SO_2$ during a recycling process, sulphur is often removed by reaction with aqueous alkali carbonates to convert $PbSO_4$ to $PbCO_3$. In this work, we use desulfurised lead paste provided by our industrial partner, EnviroWales Ltd and Table 2 shows a chemical composition of the lead paste from a specification provided by the producer.

TABLE 21

Chemical composition of a desulfurised lead paste provided by EnviroWales Ltd.

| | wt % |
|---|---|
| $PbCO_3$ | 60 |
| $PbO_2$ | 28 |
| PbO | 9 |
| Pb | 3 |

Firstly, lead paste was mixed with Oxaline or Ethaline 200. Dissolution of lead paste in Oxaline was accompanied by a gas evolution. This phenomenon was also observed when oxalic acid (as Oxaline) was added dropwise to the mixture of Pb paste and Ethaline 200. To identify the gas produced upon mixing the reaction between lead paste and oxalic acid, we used a simple experiment with a lighted splint. For all samples, the gas extinguished a lighted splint, indicating a formation of carbon dioxide. As the reaction progressed, a formation of colloidal suspensions at room temperature was observed and accelerated by vigorous stirring.

Proposed chemical reactions of components of lead paste with oxalic acid in Oxaline could be formulated as:

$PbCO_3 + C_2H_2O_4 \rightarrow Pb(C_2O_4)\downarrow + H_2O + CO_2$ (Eq. 2.1)

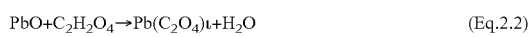
$PbO + C_2H_2O_4 \rightarrow Pb(C_2O_4)\downarrow + H_2O$ (Eq. 2.2)

$PbO_2 + 2C_2H_2O_4 \rightarrow Pb(C_2O_4)\downarrow + 2H_2O + 2CO_2$ (Eq. 2.3)

Reactions between lead carbonate or lead oxide and oxalic acid would lead to a formation of highly insoluble lead oxalate, $Pb(C_2O_4)$ or Pb(ox), water and carbon dioxide (Eq. 2.1 and 2.2). As $PbO_2$ is a strong oxidising agent, a redox reaction would be expected. Most likely, the oxalate ion is being oxidised to provide electrons for reducing $Pb^{4+}$ to $Pb^{2+}$ (Eq. 2.3). Indeed, upon addition of oxalic acid to $PbO_2$ in Ethaline 200, a change in colour to pale yellow was observed indicating a change in an oxidation state of lead.

PXRD analysis of the precipitate obtained from the reaction of Pb paste and Oxaline is shown in FIG. 1. A LeBail refinement of the collected diffraction pattern demonstrates that the precipitate adopts a triclinic crystal structure with the P–1 space group of lead oxalate (ICSD, Collection Code 109331). A broad background at the low 2θ values (<35°) can be attributed to a signal from a Kapton film. The pattern also shows no evidence of reflections corresponding to other phases, supporting the chemical reactions proposed in Eq. 2.1-2.3.

Figure 2:
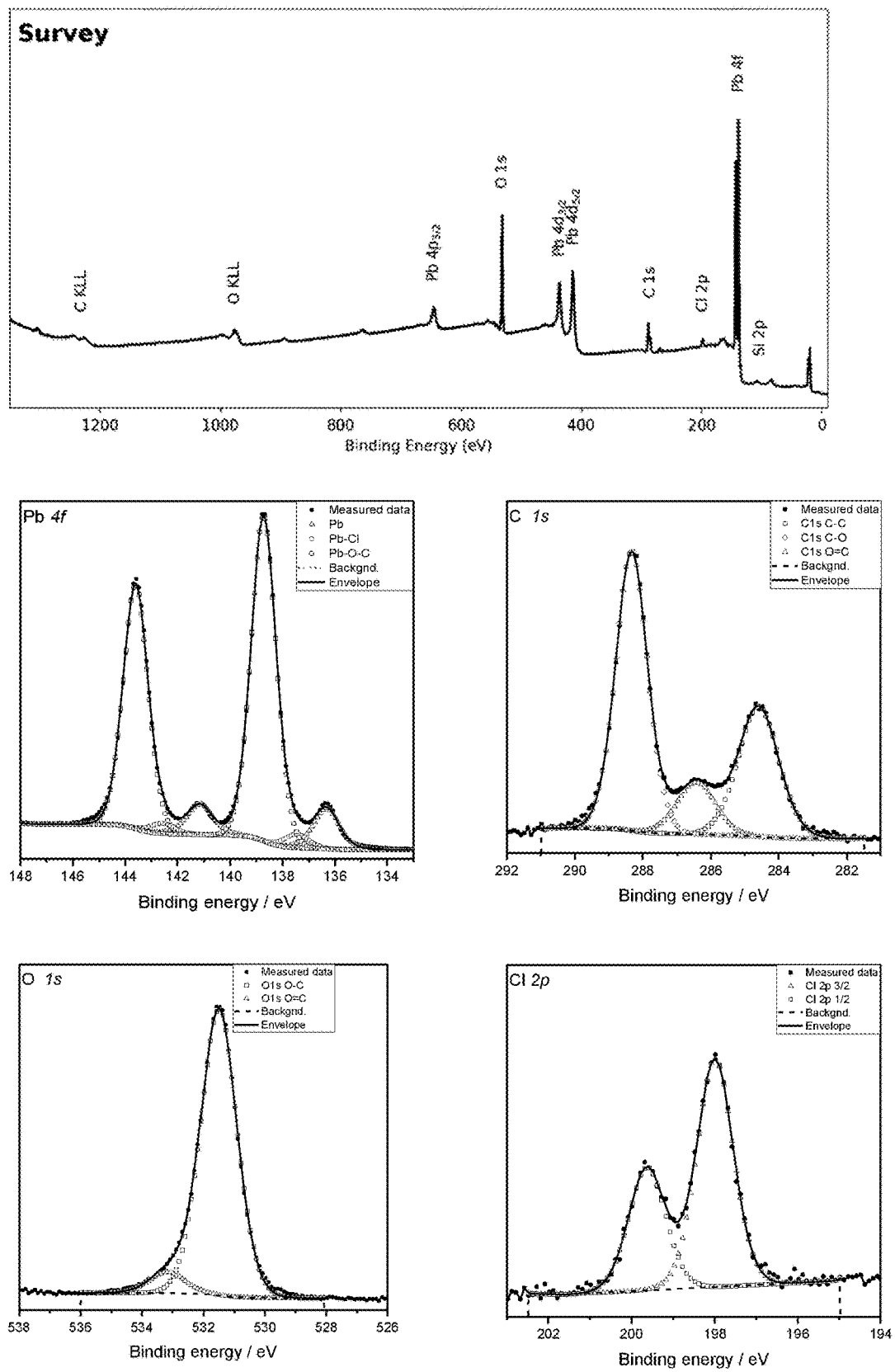
FIG. 2 shows Al Kα survey spectrum and peak-fitted core levels of Pb 4f, C 1s, O 1s and Cl 2p photoemission spectra of lead oxalate precipitate.

XPS measurements were performed to further investigate the composition and oxidation states of all elements in the precipitated powder. The binding energies obtained in the XPS analysis were corrected for specimen charging by referencing the C 1s peak to 284.8 eV. An XPS spectrum in the wide energy range of the precipitated powder shows peaks of lead, carbon, oxygen, chlorine and a minor impurity peak from silicon (FIG. 2*a*). A high-resolution spectrum of Pb 4f core level is shown in FIG. 2*b*, where three peaks of Pb $4f_{7/2}$ observed at 136.4, 138.2 and 138.9 eV can be assigned to metallic Pb, Pb—Cl and Pb—O—C, respectively. FIG. 2*c* shows the deconvolution of C 1s spectrum with three peaks; the peak at 284.8 eV is ascribed to non-oxygenated C—C bond, the carbon in C—O at 286.6 eV and the carbon in C=O at 288.5 eV, matching well with the literature values. The peaks of the O 1s spectrum in FIG. 2*d* can be assigned to C—O bond at 531.6 eV and C=O groups at 533.0 eV. Atomic ratios of lead oxalate were determined from the Pb $4f_{7/2}$(Pb—O—C), C 1s (C=O) and combined O 1s photoelectron intensities. The Pb:C:O ratios are 1:2.01:4.05 and match well the stoichiometric composition of lead oxalate, $PbC_2O_4$.

A chlorine spectrum in FIG. 2*e* shows two peaks at 198.2 and 199.8 eV corresponding to Cl $2p_{3/2}$ and $2p_{1/2}$ core lines, respectively and can be assigned to Pb—Cl bond. The chlorine signal may indicate presence of a residual $PbCl_2$ or $PbCl_4$ complex from the dissolution of Pb in DES (~4.4%).

Figure 3:
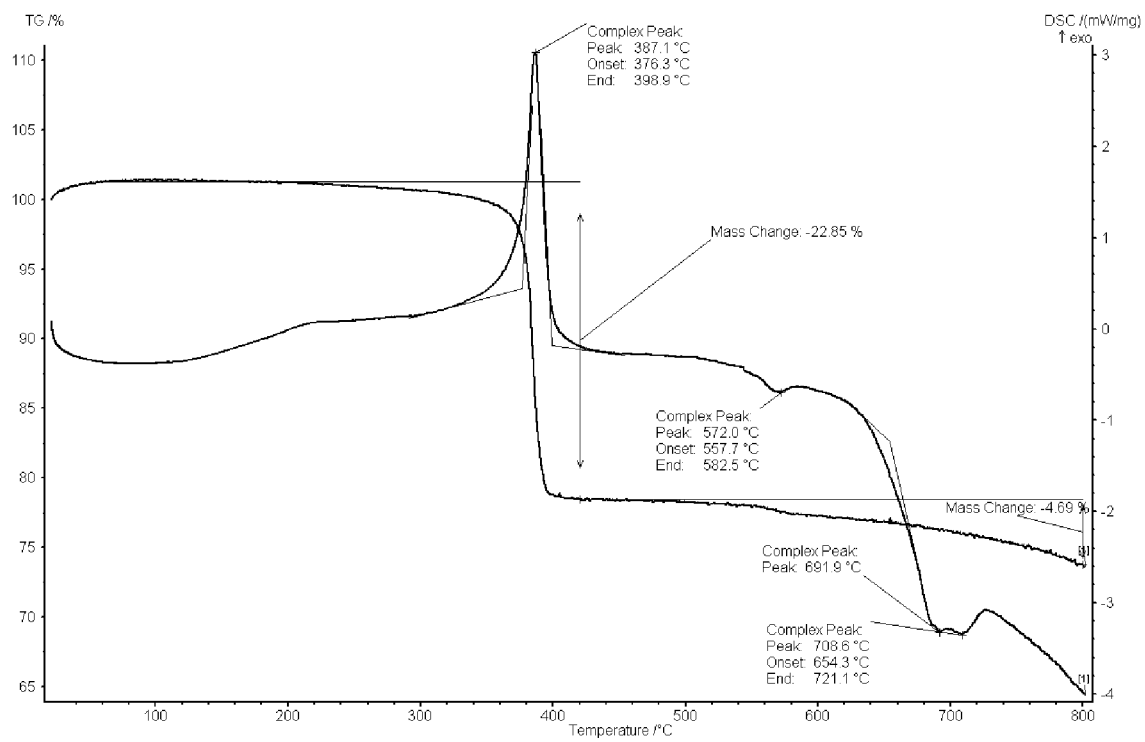
FIG. 3 shows TGA/DTA curves of lead oxalate precipitate.

Thermal decomposition processes during calcination of lead oxalate to lead oxides were observed with thermogravimetric and differential thermal analysis. TGA curve in FIG. 3 shows a weight loss step of 22.9% observed in the 200-520° C. range, which may be ascribed to a decomposition of lead oxalate to PbO. The value is lower that the theoretical weight loss value of a complete decomposition of lead oxalate to PbO (Eq. 2.4, 24.40%). However, after considering presence of metallic Pb and $PbCl_2$ in the lead oxalate precipitate as indicated by XPS data and the specification of lead paste (5.7% in total), the corrected theoretical weight loss of 22.9% is in agreement with the measured value (23.0%).

$PbC_2O_4 \rightarrow PbO + CO + CO_2$ (Eq. 2.4)

Figure 4:
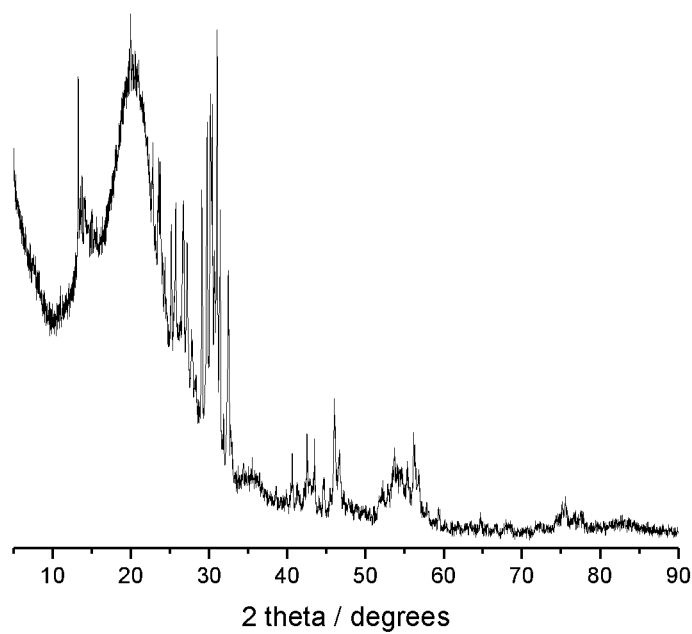
FIG. 4 shows X-ray diffraction pattern of combusted lead oxalate precipitate.

X-ray diffraction pattern of the lead oxalate precipitate combusted at 600° C. is shown in FIG. 4. Reflections corresponding to polymorphs of lead oxides (PbO, $Pb_3O_4$ and $PbO_2$) are observed. The final chemical composition and morphology of the combusted product can be modified in future by i.e. altering the temperature of the decomposition step and controlling phase transitions between lead oxides at different temperature ranges.

Here, we have shown a proof of concept of converting spent lead battery paste (solid battery waste mainly composed of lead and lead-compounds) to produce lead oxide(s), a commodity lead material which can be directly used in a production of new batteries. The process is based on two simple chemical conversion steps: (1) precipitation of highly insoluble lead oxalate from a DES solution with oxalic acid and (2) a combustion of lead oxalate to lead oxides at temperatures as low as 400° C. The method described herein offers a low-energy and low-pollution chemical alternative to current smelting processes dominating the lead-acid battery recycling industry.

Example 2

Deep Eutectic Solvents Preparation

The natural DES (NADES) used in this example was a mixture of DL-malic acid:β-alanine:water in a 1:1:5 molar ratio.

Experimental Procedures 0.6 g, 1.0 g, 1.5 g, 2.0 g, 2.5 g of lead carbonate basic was added to 10 ml NADES respectively. Then the NADES was stirred on the hotplate at room temperature for 4 days. Thus, they were centrifuged at 6000 rpm for 45 minutes via Eppendorf 5804 centrifuge. The liquor was collected and filtered through 0.2 mm PES syringe filter. The precipitate was collected respectively and washed via three steps. The precipitate was resuspended in the de-ionized water in the same centrifuge tube and the suspension was centrifuged at 6000 rpm for 15 minutes. Then the liquor was removed. The precipitate was then washed again with water and finally with acetone via the same washing protocol. After that, the precipitate was transferred in a glass vial covered with aluminium foil. The precipitate was dried in Büchi B-585 oven at 60° C. under vacuum overnight. Further analysis (PXRD, FTIR, $^1$H NMR) was carried out on the precipitate and ICP-OES was carried out on the lead concentration in solution.

Results

A series of samples of lead carbonate basic in NADES with different lead concentrations was prepared (Table 3). The resulting concentrations of Pb in NADES were analysed with ICP-OES and the results are summarised in Table 3.

TABLE 3

Lead carbonate basic starting concentrations and lead concentrations in NADES from ICP-OES

| Lead carbonate loading | | Lead concentration in NADES | | | |
|---|---|---|---|---|---|
| g ml$^{-1}$ | g L$^{-1}$ | g L$^{-1}$ | ±g L$^{-1}$ | [wt %] | [wt %] |
| 0.06 | 60 | 46.63 | 0.81 | 96.97 | 1.68 |
| 0.10 | 100 | 75.65 | 0.51 | 86.75 | 0.58 |
| 0.15 | 150 | 101.94 | 1.44 | 84.80 | 11.16 |
| 0.20 | 200 | 30.89 | 9.27 | 12.54 | 3.76 |
| 0.25 | 250 | 23.68 | 0.24 | 11.82 | 0.12 |

For samples with 0.15, 0.20 and 0.25 g ml$^{-1}$ lead carbonate loading precipitation was observed. The precipitates were isolated, quantified (sample 0.20 g ml$^{-1}$) and analysed with PXRD and FTIR (samples (0.20 and 0.25 g ml$^{-1}$). The recovery rate of lead from lead precipitate for 0.20 g ml$^{-1}$ is 81 wt %.

Figure 5:
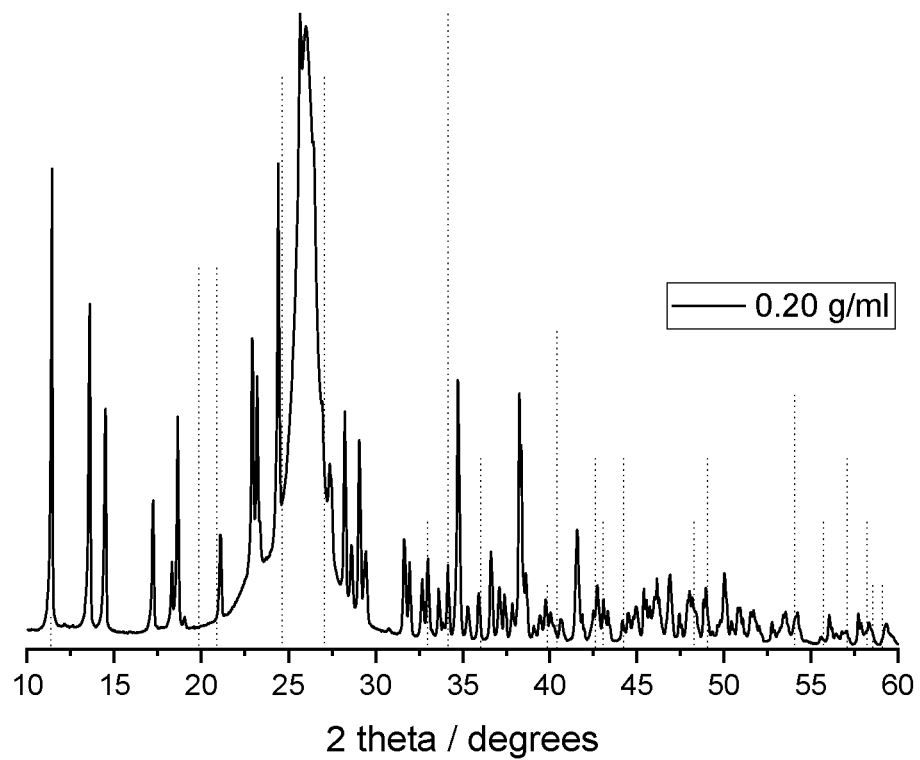
FIG. 5 shows the diffraction pattern of lead precipitate from natural DES solution and the peak intensities of lead carbonate basic.
Figure 6:
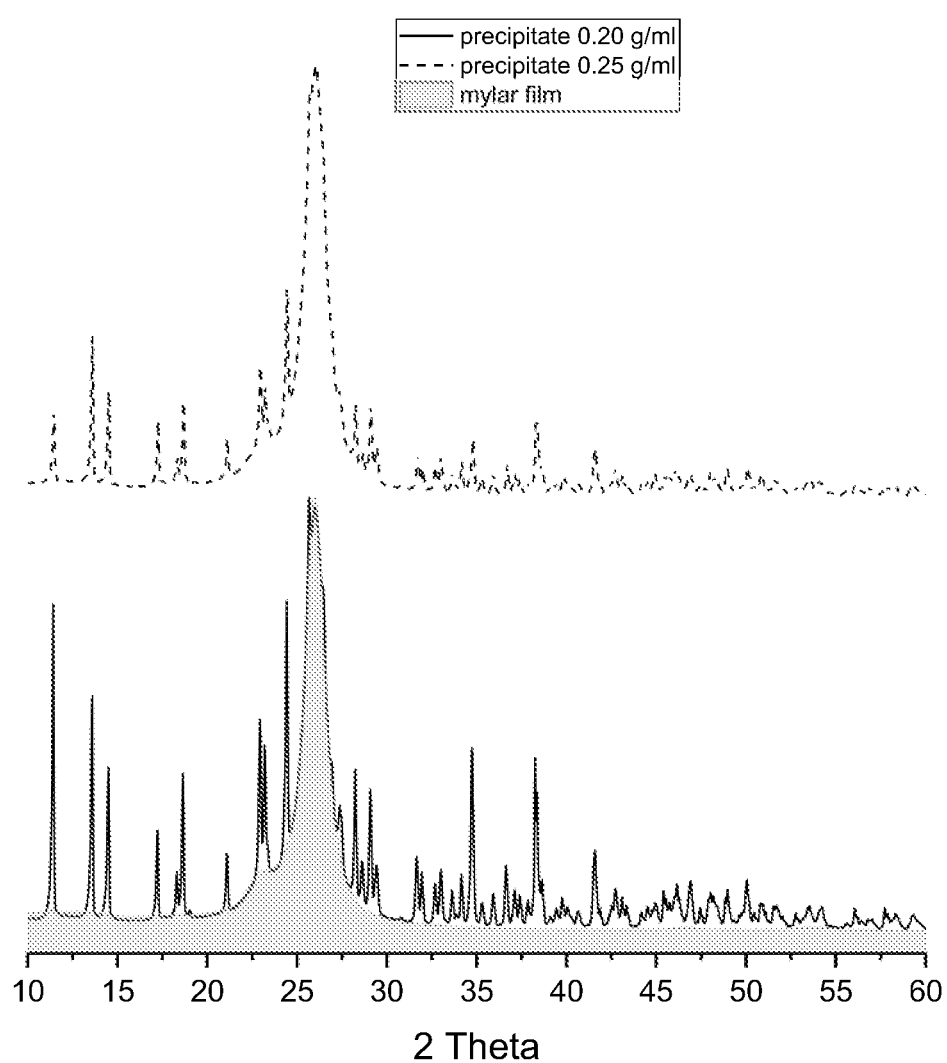
FIG. 6 shows the diffraction pattern of lead precipitate from natural DES.

No Bragg peaks corresponding to lead carbonate were observed (FIG. 5) and diffraction patterns for both, 0.20 and 0.25 g ml$^{-1}$, show the same set of reflections (FIG. 6). Based on composition of the system and previous results obtained, the expected precipitation product was lead malate.

Figure 7:
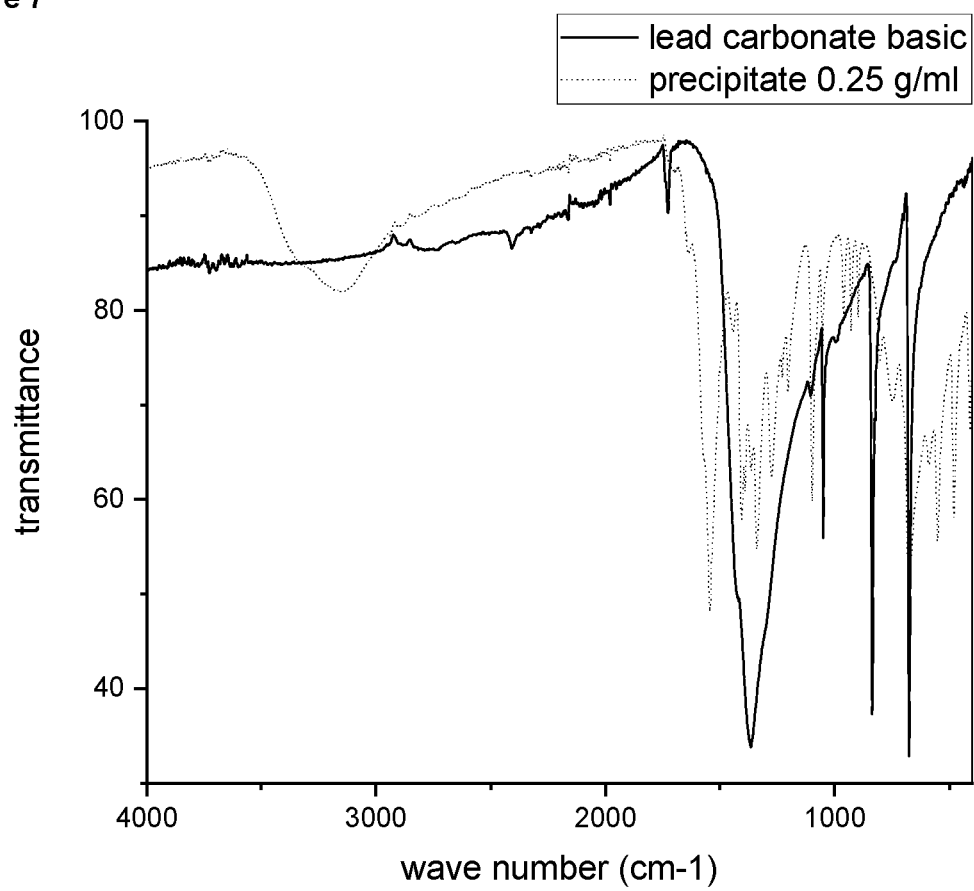
FIG. 7 shows the FTIR spectra of lead precipitate and lead carbonate basic.
Figure 8:
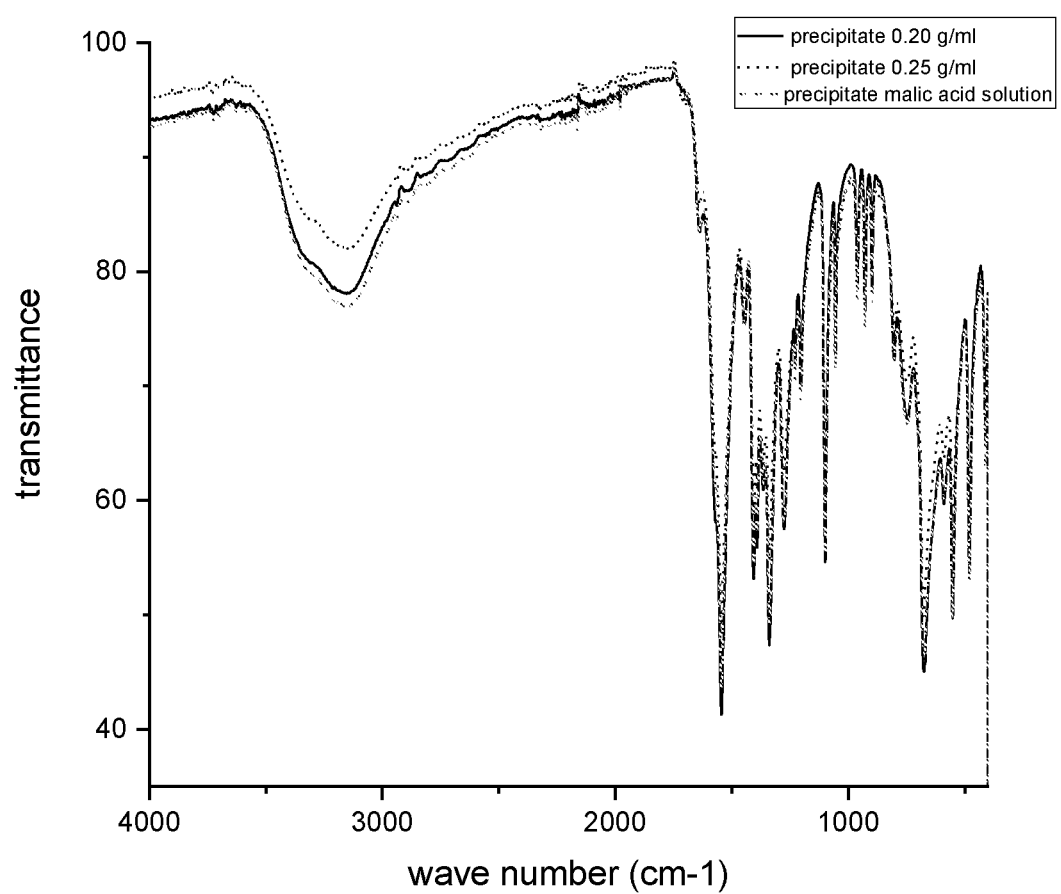
FIG. 8 shows the FTIR spectra of lead precipitate from natural DES and malic acid solution.

FTIR analysis of the precipitates also does not show presence of lead carbonate (FIG. 7) with the same peaks for both 0.20 and 0.25 g ml$^{-1}$ samples (FIG. 8).

To confirm a formation of lead malate and eliminate possibility of alanine derivatives as precipitation product(s) in the studied system, a dissolution of lead carbonate basic precipitation from pure malic acid solution was performed. The resulting precipitate was isolated and analysed with FTIR. The spectrum is shown in FIG. 8 and shows the same peaks as precipitates from NADES, further indicating formation of lead malate as a product of the reaction.

$^1$H NMR spectrum of NADES after precipitation recovery showed no indication of solvent decomposition up chemical extraction of lead, confirming suitability of the system for solvent recovery and continuous processing.

Summary

We have shown that NADES have excellent solvation properties, with up to 250 g L$^{-1}$ loading of lead material and lead extraction rates of 81%. These solubility values are unprecedented for any other solvent system.

Embodiments of the invention have been described by way of example only. It will be appreciated that variations of the described embodiments may be made which are still within the scope of the invention.

The invention claimed is:

1. A method comprising:
    combining a lead- or tin-based material, or a mixture thereof, and a compound comprising a carboxylic acid moiety in the presence of a deep eutectic solvent; and
    precipitating lead or tin carboxylate;
    wherein the lead-based material comprises Pb, PbO, PbO$_2$, PbSO$_4$, PbCO$_3$, (PbCO$_3$)$_2$.Pb(OH)$_2$, PbTe, or APbX$_3$, or a mixture thereof, wherein A is CH$_3$NH$_3$ or HC(NH$_2$)$_2$ and each X is independently I, Br or Cl; and
    wherein the tin-based material comprises ASnX$_3$, wherein A is CH$_3$NH$_3$ or HC(NH$_2$)$_2$ and each X is independently I, Br or Cl.

2. The method of claim 1 comprising:
    combining a lead- or tin-based material, or a mixture thereof, with a deep eutectic solvent;
    adding a compound comprising a carboxylic acid moiety; and
    precipitating lead or tin carboxylate;
    wherein the lead-based material comprises Pb, PbO, PbO$_2$, PbSO$_4$, PbCO$_3$, (PbCO$_3$)$_2$.Pb(OH)$_2$, PbTe, or APbX$_3$, or a mixture thereof, wherein A is CH$_3$NH$_3$ or HC(NH$_2$)$_2$ and each X is independently I, Br or Cl; and
    wherein the tin-based material comprises ASnX$_3$, wherein A is CH$_3$NH$_3$ or HC(NH$_2$)$_2$ and each X is independently I, Br or Cl.

3. The method of claim 1 comprising:
    combining a lead- or tin-based material, or a mixture thereof, with a deep eutectic solvent comprising a compound comprising a carboxylic acid moiety; and
    precipitating lead and/or tin carboxylate;
    wherein the lead-based material comprises Pb, PbO, PbO$_2$, PbSO$_4$, PbCO$_3$, (PbCO$_3$)$_2$.Pb(OH)$_2$, PbTe, or APbX$_3$, or a mixture thereof, wherein A is CH$_3$NH$_3$ or HC(NH$_2$)$_2$ and each X is independently I, Br or Cl; and
    wherein the tin-based material comprises ASnX$_3$, wherein A is CH$_3$NH$_3$ or HC(NH$_2$)$_2$ and each X is independently I, Br or Cl.

4. The method of claim 1, wherein the compound comprising a carboxylic acid moiety is a compound of formula:

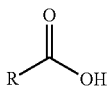

wherein R is H or a straight or branched $C_{1-6}$alkyl, substituted with 0-4 substituents selected from OH or COOH.

5. The method of claim 1, wherein the compound comprising a carboxylic acid moiety is a compound comprising at least two carboxylic acid moieties, or a compound of formula:

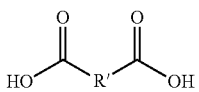

wherein R' is a straight or branched $C_{1-6}$ alkyl, substituted with 0-3 substituents selected from OH or COOH.

6. The method of claim 1, wherein the compound comprising a carboxylic acid moiety is acetic acid, oxalic acid or citric acid or a mixture thereof.

7. The method of claim 1, wherein the deep eutectic solvent comprises a hydrogen bond donor and an ammonium salt or a metal chloride hydrate and a hydrogen bond donor.

8. The method of claim 7, wherein (a) the hydrogen bond donor is ethylene glycol, glycerol, propylene glycol, fructose, xylitol, erythritol, 1,6-hexanediol, urea, acetamide, 1-methyl urea, 1,3-dimethyl urea, 1,1-dimethyl urea, thiourea, benzamide, oxalic acid, malonic acid, benzoic acid, adipic acid, succinic acid, citric acid or water; (b) the ammonium salt is choline chloride; and/or (c) the metal chloride hydrate is lithium chloride, sodium chloride, aluminium trichloride, tin chloride or zinc chloride.

9. The method of claim 1, wherein the deep eutectic solvent is selected from:
a) a mixture of choline chloride and urea, wherein the molar ratio is about 4:1 to 1:6;
b) a mixture of choline chloride and ethylene glycol, wherein the molar ratio is about 5:1 to 1:20;
c) a mixture of choline chloride and propylene glycol, wherein the molar ratio is about 5:1 to 1:20;
d) a mixture of choline chloride and butanediol, wherein the molar ratio is about 5:1 to 1:20;
e) a mixture of choline chloride and glycerol, wherein the molar ratio is about 5:1 to 1:20;
f) a mixture of choline chloride and acetic acid, wherein the molar ratio is about 5:1 to 1:10;
g) a mixture of choline chloride and malonic acid, wherein the molar ratio is about 4:1 to 1:6;
h) a mixture of oxalic acid and choline chloride, wherein the molar ratio is about 2:1 to 1:2;
i) a mixture of choline chloride and glucose, wherein the molar ratio is about 6:1 to 1:6;
j) a mixture of choline chloride and fructose, wherein the molar ratio is about 6:1 to 1:6;
k) a mixture of choline chloride and xylitol, wherein the molar ratio about 6:1 to 1:6;
l) a mixture of choline chloride and erythritol, wherein the molar ratio is about 6:1 to 1:6;
m) a mixture of lithium chloride and ethylene glycol, wherein the molar ratio is about 4:1 to 1:4;
n) a mixture of sodium chloride and ethylene glycol, preferably wherein the molar ratio is about 4:1 to 1:4;
o) a mixture of lithium chloride and water, wherein the molar ratio is about 4:1 to 1:4;
p) a mixture of aluminium trichloride and acetamide, wherein the molar ratio is about 4:1 to 1:4;
q) a mixture of aluminium trichloride and urea, wherein the molar ratio is about 4:1 to 1:4; or
r) a mixture of tin chloride dihydrate and ethylene glycol, wherein the molar ratio is about 4:1 to 1:4.

10. The method of claim 1, wherein the deep eutectic solvent comprises oxalic acid and choline chloride or ethylene glycol and choline chloride.

11. The method of claim 1, wherein the deep eutectic solvent is a natural deep eutectic solvent comprising: an acid and quaternary ammonium salt; an acid and betaine an acid and an amino acid; an acid and a sugar, wherein the acid, amino acid, sugar and quaternary ammonium salt are selected from the group consisting of choline chloride, choline bitartrate, betaine, lactic acid, DL-malic acid, citric acid, phytic acid sodium, D/L-proline, D-proline, L-proline, L-serine, L-glutamic salt, D-(+)-glucose, D-(−)-fructose, -alanine, malonic acid, maleic acid, aconitic acid, L-(+)-tartaric acid, glycol, 1,2-propanediol, glycerol, meso-erythritol, xylitol, adonitol, ribitol, D-sorbitol, D-xylose, A-L-rhamnose, sorbose, D-mannose, D-(+)-galactose, sucrose, D-(+)-trehalose, maltose, raffinose, proline, oxalic acid, lactose, inositol, and proline.

12. The method of claim 1, wherein the deep eutectic solvent is a natural deep eutectic solvent selected from the group consisting of choline chloride, choline bitartrate, betaine, lactic acid, DL-malic acid, citric acid, phytic acid sodium, D/L-proline, D-proline, L-proline, L-serine, L-glutamic salt, D-(+)-glucose, D-(−)-fructose, -alanine, malonic acid, maleic acid, aconitic acid, L-(+)-tartaric acid, glycol, 1,2-propanediol, glycerol, meso-erythritol, xylitol, adonitol, ribitol, D-sorbitol, D-xylose, A-L-rhamnose, sorbose, D-mannose, D-(+)-galactose, sucrose, D-(+)-trehalose, maltose, raffinose, proline, oxalic acid, lactose, inositol, and proline.

13. The method of claim 1 wherein the lead-based material is a de-sulfurised lead-based material.

14. The method of claim 1, wherein the lead-based material comprises Pb, PbO, $PbO_2$, $PbCO_3$, or $(PbCO_3)_2.Pb(OH)_2$, or a mixture thereof.

15. The method of claim 1, wherein a concentration of lead- and/or tin-based material of about 1 $gL^{-1}$ to about 100 $gL^{-1}$ is dissolved in the deep eutectic solvent.

16. The method of claim 1, wherein a concentration of lead- and/or tin-based material of about 0.005 mol $L^{-1}$ to about 0.5 mol $L^{-1}$ is dissolved in the deep eutectic solvent.

17. The method of claim 1, further comprising the step of filtering the precipitated lead and/or tin carboxylate.

18. The method of claim 17, further comprising the step of heating the lead carboxylate to form leady oxide.

19. The method of claim 1, wherein the method is a batch process.

20. The method of claim 1, wherein the method is a continuous process.

21. A mixture comprising a lead- and/or tin-based material, a compound comprising a carboxylic acid moiety and a deep eutectic solvent, wherein the lead-based material comprises Pb, PbO, $PbO_2$, $PbSO_4$, $PbCO_3$, $(PbCO_3)_2.Pb(OH)_2$, PbTe, or $APbX_3$, or a mixture thereof, wherein A is $CH_3NH_3$ or $HC(NH_2)_2$ and each X is independently I, Br or Cl; and wherein the tin-based material comprises $ASnX_3$, wherein A is $CH_3NH_3$ or $HC(NH_2)_2$ and each X is independently I, Br or Cl, wherein the deep eutectic solvent is a natural deep eutectic solvent selected from the group consisting of choline chloride, choline bitartrate, betaine, lactic acid, DL-malic acid, citric acid, phytic acid sodium, D/L-proline, D-proline, L-proline, L-serine, L-glutamic salt, D-(+)-glucose, D-(−)-fructose, -alanine, malonic acid, maleic acid, aconitic acid, L-(+)-tartaric acid, glycol, 1,2-propanediol, glycerol, meso-erythritol, xylitol, adonitol, ribitol, D-sorbitol, D-xylose, A-L-rhamnose, sorbose, D-mannose, D-(+)-galactose, sucrose, D-(+)-trehalose, maltose, raffinose, proline, oxalic acid, lactose, inositol, and proline.

* * * * *